US007667866B2

(12) United States Patent
Tsukada

(10) Patent No.: US 7,667,866 B2
(45) Date of Patent: Feb. 23, 2010

(54) PRINTING APPARATUS, DATA STORAGE MEDIUM, INTERFACE DEVICE, PRINTER CONTROL METHOD, AND INTERFACE CONTROL METHOD

(75) Inventor: Toshihiro Tsukada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/337,127

(22) Filed: Dec. 17, 2008

(65) Prior Publication Data

US 2009/0109487 A1 Apr. 30, 2009

Related U.S. Application Data

(62) Division of application No. 09/942,828, filed on Aug. 29, 2001, now Pat. No. 7,483,163.

(30) Foreign Application Priority Data

Aug. 30, 2000 (JP) ............................. 2000-261084

(51) Int. Cl.
  *G06K 15/02* (2006.01)
(52) U.S. Cl. ...................... 358/1.16; 358/1.15; 714/100
(58) Field of Classification Search ................ 358/1.15, 358/1.16; 709/203, 220, 221; 347/5; 714/100; 399/1; 710/8, 13
See application file for complete search history.

(56) References Cited

U.S. PATENT DOCUMENTS

| 4,719,516 | A | 1/1988 | Nagashima |
| 4,826,332 | A | 5/1989 | Ukai et al. |
| 5,103,318 | A | 4/1992 | Takaoka |
| 5,131,077 | A | 7/1992 | Indei |
| 5,481,656 | A | 1/1996 | Wakabayashi et al. |
| 5,553,202 | A | 9/1996 | Wakabayashi et al. |
| 5,884,112 | A | 3/1999 | Funahashi et al. |
| 6,394,571 | B1 * | 5/2002 | Yano et al. ..................... 347/17 |
| 6,491,453 | B1 | 12/2002 | Fukano et al. |
| 6,498,611 | B1 * | 12/2002 | Beard et al. .................. 715/752 |
| 6,615,297 | B1 * | 9/2003 | Beard et al. ................... 710/62 |
| 6,765,686 | B2 * | 7/2004 | Maruoka .................... 358/1.16 |
| 6,842,766 | B2 | 1/2005 | Brockway et al. |
| 2003/0115256 | A1 | 6/2003 | Brockway et al. |

(Continued)

FOREIGN PATENT DOCUMENTS

EP 0911172 A2 4/1999

(Continued)

*Primary Examiner*—Kimberly A Williams
(74) *Attorney, Agent, or Firm*—Rosalio Haro

(57) ABSTRACT

An interface device backs up printer settings and operating history data of printer so that the settings and history data can be easily restored. A nonvolatile memory 109 in the printer 101 stores printer settings data. Commands from a host 161 are passed by the interface device 131 and received by a receiver 103 within the printer. If the command data is a print command, the print mechanism 108 prints the specified text or image. If the command data is a command for updating the settings data, the corresponding settings data in the nonvolatile memory 109 is updated and at an appropriate backup time the updated settings data is copied to a nonvolatile memory 135 in the interface device 131. The settings data backed up into the interface device 131 can then be restored back to the printer's nonvolatile memory 109 at an appropriate data restore time.

17 Claims, 4 Drawing Sheets

U.S. PATENT DOCUMENTS

| | | | |
|---|---|---|---|
| 2003/0137680 A1* | 7/2003 | Maruoka | 358/1.16 |
| 2003/0167361 A1* | 9/2003 | Beard et al. | 710/8 |
| 2007/0070401 A1* | 3/2007 | Okamoto et al. | 358/1.15 |

FOREIGN PATENT DOCUMENTS

| | | | |
|---|---|---|---|
| EP | 0957447 A2 | 11/1999 | |
| JP | 553386 A | 3/1993 | |
| JP | 6297817 A | 10/1994 | |
| JP | 9319265 A | 12/1997 | |
| JP | 10307760 A | 11/1998 | |

* cited by examiner

PRINTING APPARATUS, DATA STORAGE MEDIUM, INTERFACE DEVICE, PRINTER CONTROL METHOD, AND INTERFACE CONTROL METHOD

CROSS-REFERENCE TO RELATED APPLICATIONS

This application is a divisional of, and claims priority under 35 U.S.C. § 120 from U.S. application Ser. No. 09/942,828 filed on Aug. 29, 2001. Japanese Patent application No. 2000-261084 filed Aug. 30, 2000 from which application Ser. No. 09/942,828 claims priority under 35 U.S.C. § 119, is hereby incorporated by reference in its entirety.

BACKGROUND

1. Field of Invention

The present invention relates generally to a printer, a data storage medium, an interface device, a printer control method, and an interface control method. More specifically, this invention relates to a printer that is useful for backup storage of printer settings and operating history data, an interface device, a printer control method, an interface control method, and a computer-readable data storage medium for recording a program that achieves the backup storage functions.

2. Description of Related Art

There are many prior art printers that store printer settings in flash EEPROM (Electrically Erasable Programmable Read Only Memory). This information is used to restore printer settings when the power is turned on so that the printer operates according to the preferred user settings. Such printers also typically store such historical data as ink cartridge replacement data, ink consumption, the number of pages printed, and the remaining ink volume to flash EEPROM. This printer operating history can then be examined to help reduce printing costs, improve ink characteristics, and make other various improvements to the printer.

Different interface standards (such as RS-232C, USB (Universal Serial Bus), and parallel) can also be used to connect the printer with the host device that sends print commands, printer settings, and other command data to the printer. Interface devices are used to convert the TTL voltage level and the specific interface standard used by the host device for communication with the printer. Modular interface device technologies enabling a printer's interface device to be replaced are also available. This makes it possible to make a printer compatible with different communication interfaces by simply installing the appropriate interface device. Existing printers can therefore be made compatible with new interface standards by simply replacing the interface device.

A problem with such prior art printers is that the flash EEPROM is typically mounted on the same main circuit board on which the printer control CPU, RAM used for temporary storage by the printer, ROM for nonvolatile storage of the printer initialization program and font data, and other components are mounted. In the prior art, when a problem arises in any one of these components causing the main board to malfunction it is difficult to extract the settings and historical data stored in the main board's flash EEPROM and restore this data to another flash EEPROM on a replacement board.

There is therefore a need for technology that enables printer settings and history data to be easily backed up so that the settings and history data can be easily restored following the repair of a printer's main circuit board.

OBJECTS OF THE INVENTION

Therefore, it is an object of the present invention to overcome the aforementioned problems.

It is another object of the present invention to provide a solution that makes use of the aforementioned modular interface device.

SUMMARY OF INVENTION

The present invention is therefore directed to a solution for the above problem, and an object of this invention is to provide a printer that is useful for backing up printer settings and history data, an interface device, a computer-readable data storage medium for recording a program that stores these settings and history data to the printer, and a printer control method and an interface control method typically achieved by running said program.

User-defined printer settings and printer history data such as ink consumption, referred to below as the "protected data," are updated to values different from default settings (values preset at the factory prior to shipping), and stored to a rewritable protected data memory located on a main circuit board of the printer. As a result of accumulated research into a solution for the problems described above, it has been found that by storing, i.e. backing up, this protected data at specific times to a rewritable protected, i.e. nonvolatile, data reserve memory located in an interface device, or other component separate from the main circuit board, the protected data can be easily restored from this rewritable protected data reserve memory to another rewritable protected data memory located on a newly installed main circuit board when the previous main circuit board malfunctions and is replaced.

A printer according to a first aspect of our invention has a rewritable protected data memory unit for storing protected data including printer settings and history data; a receiver for receiving command data from a host device through an interface device; a printing unit for printing print document data based on print data from the command data received by the receiver; a data update unit for updating the protected data; and a data protection unit for backing up and restoring the protected data updated by the data update unit.

The data protection unit preferably has a backup unit for copying the protected data stored in the protected data memory unit to a data rewritable protected data reserve memory unit at specific times or in response to specific events.

Further preferably, the data protection unit also has a data restore unit for restoring protected data from the protected data reserve memory unit to the protected data memory unit at specific times or in response to data restore events. The restored data is preferably data previously stored by the backup unit into the protected data reserve memory unit.

The data protection unit preferably also has a backup/restore control unit for determining when to initiate a backup and a restore sequence in accordance with specific events.

Yet further preferably, the protected data reserve memory unit is disposed in the interface device, but it is to be understood that the protected data reserve memory unit may also be located on an auxiliary computer board within the printer and separate from the main board on which resides the protected data memory unit.

A printing apparatus according to another aspect of our invention includes a receiver, a printing unit, a data update unit, a backup unit, and a nonvolatile data memory unit for storing selected data that is to be protected and maintain even when power is removed from the printer. The printing apparatus is further connected to a host device through an interface device having a reserve memory unit for storing at least copies of the selected data stored in the nonvolatile data memory unit. The reserve memory unit is preferably nonvolatile memory.

The selected data stored in the nonvolatile data memory unit of this printer preferably includes printer settings data.

The printing apparatus's receiver receives command data sent from a host device and relayed by the interface device. The printing unit prints text or image data when the received command data is a print command specifying text or image data. The data update unit updates the printer settings data when the received command data is an instruction for updating the settings data stored in the nonvolatile data memory unit. The backup unit copies the updated printer settings data from the nonvolatile data memory unit to the nonvolatile, reserve memory unit of the interface device.

Further preferably, the backup unit of this aspect in the invention copies and stores the settings data when the settings data is updated by the data update unit.

Yet further preferably, the backup unit in this aspect of the invention copies and stores the settings data when the printing apparatus's power is turned on.

Yet further preferably, the printing apparatus also has a power off command input means. In this case, the power off command input means accepts commands that request an interruption of power supply to the printing apparatus, and when such a power off command is received, the backup unit copies and stores the settings data.

Yet further preferably, the printing apparatus also has a data restore unit for copying printer settings data from the reserve memory unit of the interface device to the nonvolatile data memory unit.

Yet further preferably, the data restore unit copies and saves the printer settings data from the reserve memory unit to the nonvolatile data memory unit if, upon turning on the printing apparatus, it is found that printer settings data is not stored in the nonvolatile data memory unit. No copy and restore operation is implemented, however, if it is found that the printer settings data is also not stored in the reserve memory unit. In other words, the data restore unit reads the data stored in the reserve memory unit, and if the back unit determines that it does not hold data values different from the factory issued default values, then no update and restore sequence is implemented.

A further aspect of our invention is a computer-readable data storage medium for recording a program causing a computer connected to a host device through an interface device having a protected data reserve memory unit to function as a printing apparatus according to this invention as described herein.

This data storage medium includes the following: a Compact Disc, a floppy disk, a hard disc, a magneto-optical disc, a digital video disc or digital versatile disc, a magnetic tape, semiconductor memory, and a memory card.

This data storage medium could also be made accessible through a server on the World Wide Web (WWW) so that the program can be downloaded to update a program stored in the computer and the updated program can be run by the computer (typically the CPU of the printer) to achieve a printing apparatus according to our invention. In this situation, it is preferred that the computer be an integral part of the printing apparatus. Alternatively, the program may be downloaded by a personal computer, PC, and then transferred from the PC to an attached printer such that the printer achieves the above described backup and restore performance. In still another embodiment, the downloaded program combine the functionality of an attached printer with those of the PC. This would be advantageous in situations when the attached printer does not have an interface device with an extra reserve memory unit. In this situation, the printer may backup its onboard nonvolatile data memory unit to the PC's internal nonvolatile memory, such as its hard drive. During restore operations, the data previously stored in the PC's hard drive may be downloaded to the printer's internal nonvolatile data memory unit.

A further aspect of our invention is an interface device connected to a printing apparatus having a nonvolatile data memory unit for storing settings data and connected to a host device. The interface device has a protected, i.e. nonvolatile, reserve data memory unit, a connection unit, a relay receiver, and a relay transmitter.

The reserve memory unit stores settings data, and any other data that should be protected, stored in the nonvolatile data memory unit of the printing apparatus. The connection unit connects the reserve memory unit to the printing apparatus in order to copy settings data and other protected data from the printing apparatus to the reserve memory unit. The relay receiver receives command data sent from the host device, and the relay transmitter transmits the received command data to the printing apparatus.

The connection unit in this aspect of the invention preferably also connects the reserve memory unit to the printing apparatus for copying settings data and other protected data from the reserve memory unit to the printing apparatus.

A further aspect of this invention is a printing apparatus control method having the following steps: a receive step for receiving command data from a host device through an interface device; a printing step for printing print document data based on the command data received by the receive step; a data update step for updating protected data such as data that should not be lost if power is removed from the printing apparatus, the protected data including settings data and history data stored to a rewritable nonvolatile data memory unit; and a data protection step for backing up protected data updated by the data update step.

The data protection step preferably includes a backup step for copying the protected data from the nonvolatile data memory unit to a nonvolatile, rewritable data reserve memory unit at a specific backup time or in response to specific events.

Yet further preferably, the data protection step also includes a data restore step for copying protected data (which had been previously copied into the reserve memory unit in the backup step) from the reserve memory unit to the printing apparatus's nonvolatile data memory unit at a specific data restore time or in response to a specific data restore event. The data protection step preferably also includes a timing control step for requesting a backup operation and/or a restore operation in response to specific conditions.

Yet further preferably, the reserve memory unit is disposed in the interface device.

A printer control method according to a further aspect of this invention controls a printer having a protected, i.e. nonvolatile, settings data memory unit for storing settings data and connected to a host device through an interface device having a protected, i.e. nonvolatile, data reserve memory unit. for The printer control method has a receive step, a printing step, a data update step, and a data backup step.

The receive step receives command data sent from a host device and relayed by the interface device. The printing step prints text or image data when the received command data is a print command specifying text or image data. The data update step updates the printer settings data in the nonvolatile, settings data memory unit when the received command data is a command for updating settings data. The backup step copies settings data from the nonvolatile, settings data memory unit to the nonvolatile, reserve memory unit of the interface device.

Preferably, the backup step copies and stores the settings data content of the settings data memory unit to the reserve memory unit when the settings data content is updated by the data update step.

Yet further preferably, the backup step copies and stores the settings data content of the settings data memory unit to the reserve memory unit when the printing apparatus's power turns on, unless the settings data memory unit contains only default settings values.

Yet further preferably, the printer control method also has a power off command input step for accepting a command for interrupting the power supply to the printing apparatus. In this case the backup step copies and stores the settings data content of the settings data memory unit to the reserve memory unit when a command for interrupting the printing apparatus's power supply is received, unless the settings data memory unit contains only default settings values.

Yet further preferably, the printer control method also has a data restore step for copying backed up settings data content from the reserve memory unit of the interface device to the nonvolatile, settings data memory unit.

Yet further preferably, the data restore step copies and saves the backed up settings data when the printing apparatus's power turns on if most current settings data is not stored in the nonvolatile settings memory unit, but is available in the reserve memory unit of the interface device.

A further aspect of this invention is an interface device control method for controlling an interface device connected to a host device and to a printer having a protected data memory unit such that it resists the loss of its stored data content if power is removed from it. The protected memory unit is used for storing settings data and other data that should be protected in case of power loss. The interface device preferably has a protected data reserve memory unit such that it also resists the loss of its stored data content if power is removed from it. The protected data reserve memory unit is effective for storing, i.e. backing up, settings data from the protected data memory unit of the printer. The interface device control method has a storing step, a relay receiving step, and a relay transmission step.

The storing step copies data content from the printer's protected data memory unit to the interface device's protected data reserve memory unit. The relay receiving step receives command data sent from the host device, and the relay transmission step relays the received command data to the printing apparatus.

This interface device control method preferably also has a data restore step for copying data content from the interface device's protected data reserve memory unit to the printer's protected data memory unit.

The interface device control method of this invention can be run and controlled by the printer. In this case it is not necessary to provide a CPU or other control means in the interface device.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention will be more fully understood from the following description of a preferred embodiment thereof with reference to the accompanying figures. It will be noted, however, that the following embodiment is described by way of example only and shall not limit the scope of the present invention. It will be obvious to one with ordinary skill in the related art that various alternative embodiments can be achieved by replacing any or all of the elements described below with a functional equivalent, and that all such alternative embodiments are also included in the scope of this invention.

Figure 1:
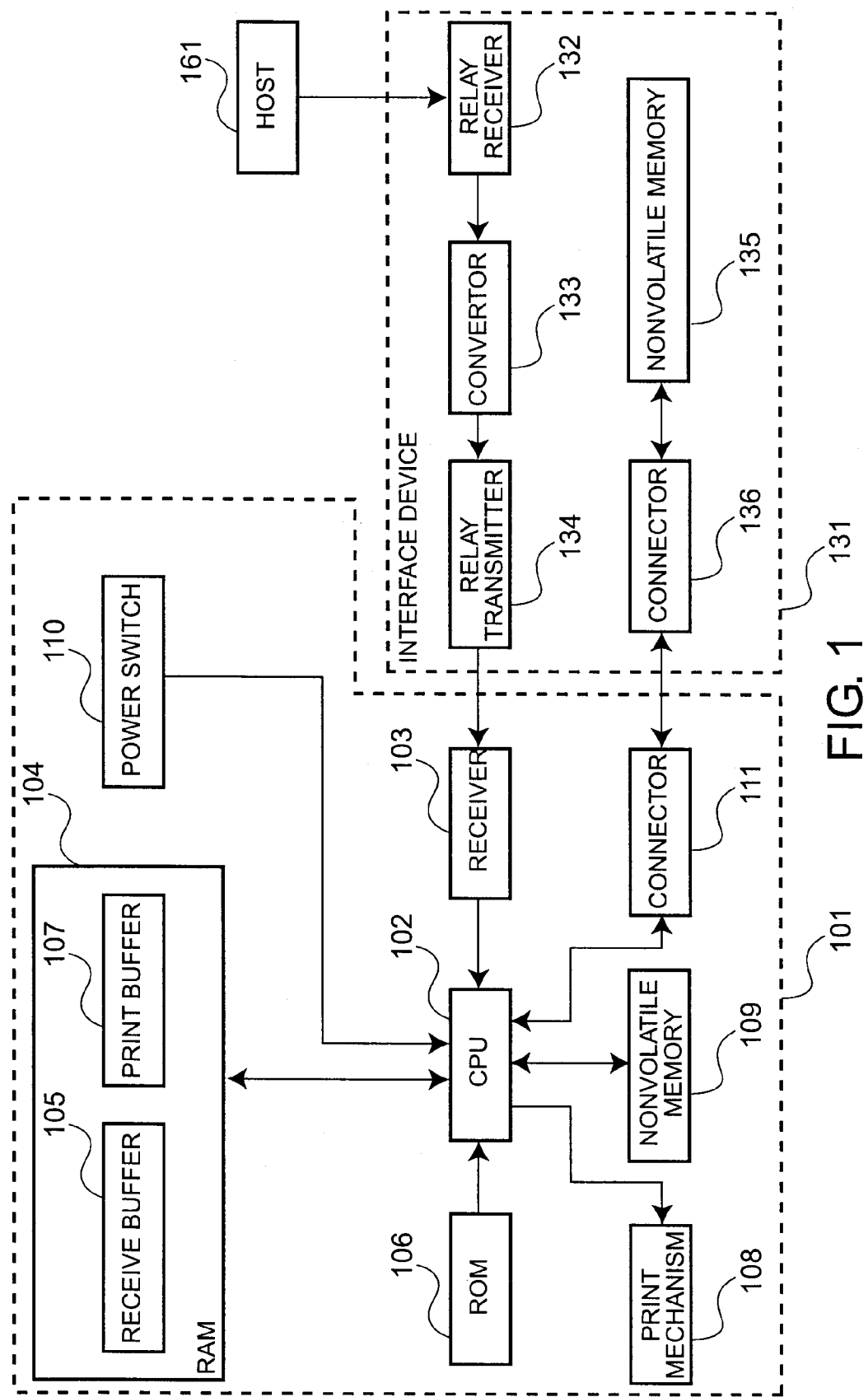
FIG. 1 is a schematic diagram of a printer and an interface device according to a preferred embodiment of the present invention.

FIG. 1 is a schematic diagram showing the parts of a printer and interface device according to a preferred embodiment of the invention. The invention is described below with reference to FIG. 1.

The printer 101 communicates with a host 161 or other external device through an interface device 131. When the host 161 sends command data to the printer 101, the data is received by a relay receiver 132 of interface device 131. A convertor 133 handles voltage level conversion and interface standards conversion for the received command data, and passes the result through a relay transmitter 134 to the printer 101.

A receiver 103 of printer 101 thus receives the command data sent from interface device 131. When the receiver 103 detects that command data has been received, it issues a receive interrupt signal to CPU 102, which controls printer 101. As part of the receive interrupt process, CPU 102 stores the command data to a receive buffer 105, which is illustratively implemented as a reserved memory block within RAM 104, and the receive interrupt process then ends.

When an interrupt is not generated, CPU 102 detects if the receive buffer 105 is empty. If command data is stored in the receive buffer 105, the CPU 102 reads and interprets the command data in FIFO (first in, first out) order.

If the command data is a print command for printing text or graphics, the CPU 102 reads from ROM 106 the appropriate font information for the text or graphics specified in the print command, and generates a print image in a print buffer 107 area of RAM 104.

When the print buffer 107 becomes full or a carriage return is detected in the interpreted command data, the print mechanism 108, which includes the print head, platen, and paper feed rollers, is driven according to the print image in the print buffer to print the text or graphic to paper, film, or other print medium.

If the command data is a printer setting command for setting a particular printer setting of printer 101, the printer setting is stored to a nonvolatile memory 109, which may be flash EEPROM or other type of flash memory or rewritable nonvolatile memory. Ink consumption by the print mechanism 108, the ink cartridge replacement date, or other history data may also be stored into nonvolatile memory 109.

The printer settings data and history data stored to nonvolatile memory 109 may include the following.

Printer settings data:
type of font used
paper size and orientation
margin size
print speed
print density
print medium type
History data:
ink replacement date, amount of ink used
number of lines printed
firmware version
operating time It will be obvious that the above printer settings and history data stored to nonvolatile memory 109 are shown by way of example only, and other information can be stored. Furthermore, the printer settings and history data stored in nonvolatile memory 109 are sent to the interface device 131 at different times. The determination of when to send this data to interface device 131 is further described below. The information sent to the interface device 131, including the above printer settings and history data, is referred to below as the "protected data".

Protected data sent to the interface device 131 is stored into nonvolatile memory 135 within interface device 131. The storing of this protected data to nonvolatile memory 135 is preferably controlled by CPU 102 of printer 101.

CPU 102 of printer 101 also controls the copying of protected data stored in nonvolatile memory 135 of interface device 131 to nonvolatile memory 109 of printer 101. This restoring of data from interface device 131 to printer 101 is conducted at different times, as explained below. It is therefore not necessary to provide a separate CPU in interface device 131 to control nonvolatile memory 135.

Power to printer 101 can be turned on and off by operating a printer power switch 110. When power is turned on, CPU 102 runs an initialization program stored in ROM 106 and runs any commands from the host.

When a power off instruction is detected due to power switch 110 being switched to its OFF position, CPU 102 first runs a specific shutdown process and then turns off the power to printer 101. This shutdown process includes, for example in case of an inkjet printer, a process for cleaning the print head of the print mechanism 108.

Power is supplied (not shown in the figure) from printer 101 to interface device 131 in accordance with operation of power switch 110.

Input and output, i.e. data transfer, of the protected data between printer 101 and interface device 131 passes through connector 111 of printer 101 and connector 136 of interface device 131.

The nonvolatile memory 135 of interface device 131 is typically connected directly to the bus of printer CPU 102 through connector 111 and connector 136.

Note that nonvolatile memory 109 functions as a rewritable, protected data memory, i.e. it resists the loss of data if power is removed from it. Such memories include flash memories, battery backed-up RAM, hard drive, etc. Similarly, nonvolatile memory 135 functions as a rewritable protected data reserve memory.

The times at which a data backup signal is issued, referred to below as the "data backup signaling," in response to which CPU 102 of printer 101 copies and stores, i.e. backs up, the protected data from nonvolatile memory 109 to nonvolatile memory 135 in interface device 131, includes the following.

(1) The protected data is backed up if the protected data stored in nonvolatile memory 109 differs from its default values when the power switch 110 is operated to turn on printer 101. Whether the stored protected data differs from the default values can be determined by, for example, detecting whether a particular counter value stored in nonvolatile memory 109 is set to a known default value, or using a checksum, a CRC (Cyclic Redundancy Check), or other technology.

(2) The protected data is backed up if the power switch 110 is operated to turn off printer 101. A mechanical process is generally part of the printer shutdown process, and typically is relatively time-consuming. The protected data is therefore backed up to nonvolatile memory 135 during this mechanical process.

(3) The protected data is backed up if command data is not received for a specific time and if the receive buffer 105 and print buffer 107 are both empty. This is typical of a situation in which CPU 102 is idle, and this idle time can therefore be used to backup the protected data.

(4) The protected data is backed up if the execution of a received command results in the updating of data stored in nonvolatile memory 109. For example, the backup process is typically run whenever a command changes a printer setting.

(5) The protected data is backed up if the received command data is a backup command requesting the backing up of data from nonvolatile memory 109 to nonvolatile memory 135. A data sequence such as follows can be used as a backup command (note that 0x is a prefix indicating hexadecimal code).

0x1b 0x1d 0x73 0x01 0x00 0x03

It will be obvious to one with ordinary skill in the related art that any of the backup triggering events noted above can be used individually or in various combinations.

The times at which a data restore signal is issued, referred to below as the "data restoresignaling," in response to which CPU 102 of printer 101 restores the protected data by copying the protected data from the nonvolatile memory 135 of interface device 131 to nonvolatile memory 109 of printer 101, includes the following.

(1) The protected data is restored if nonvolatile memory 109 is not appropriately formatted or its protected data is not correctly stored when the power switch 110 is operated to turn on the power to printer 101. This situation occurs, for example, when the data stored in nonvolatile memory 109 has been lost for some reason or when the main circuit board has been replaced due to a malfunction. If this data restore triggering mechanism is used, the repair technician does not need access to the interface device 131 used by the printer 101. After the printer 101 is repaired and the interface device 131 is reinstalled, the present data restore process automatically copies the protected data from the nonvolatile memory 135 of the interface device 131 to the nonvolatile memory 109 of the printer 101 when the power is turned on.

(2) The protected data is restored if the received command data is a data restore command requesting the restoring of data from nonvolatile memory 135 to nonvolatile memory 109. A data sequence such as follows can be used as a data restore command (note that 0x is a prefix indicating hexadecimal code).

0x1b 0x1d 0x73 0x02 0x00 0x03

When the main circuit board is repaired, the service technician, for example, can send this command to the printer 101 to restore the protected data.

It will be obvious to one with ordinary skill in the related art that any of the restore triggering events noted above can be used individually or in various combinations.

Figure 2:
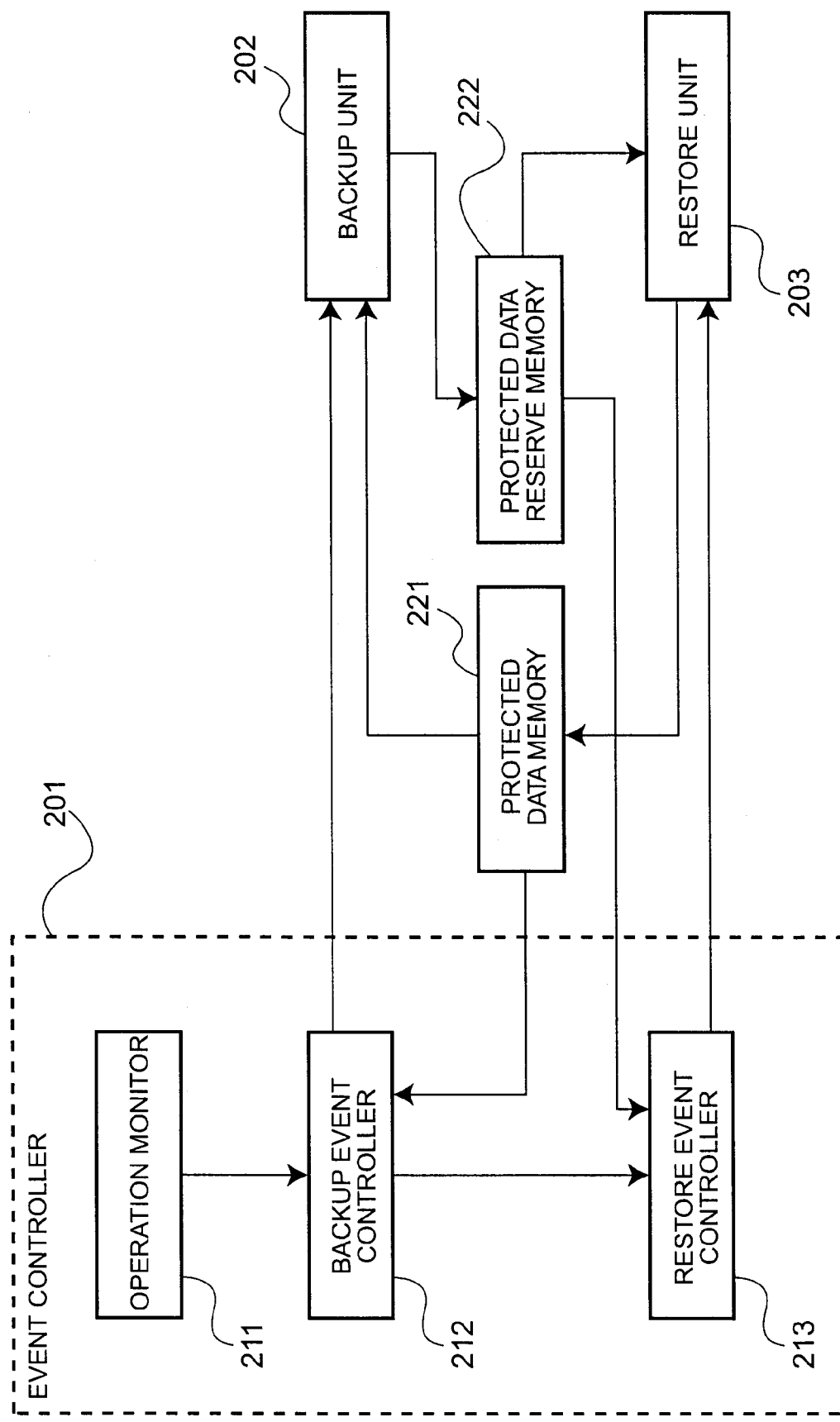
FIG. 2 is a functional block diagram showing the functions of a general data protection unit in accord with the present invention, as implemented in the CPU of FIG. 1 in combination with the printer's nonvolatile protected data memory unit, or as suitable for implementation with discrete components.

In the example of FIG. 1, the protection unit of the present invention is implemented by CPU 102, which not only determines when to initiate a backup and restore operation, but also controls their execution. FIG. 2 shows a general block diagram of the functional blocks that constitute the present data protection unit, along with a backup reserve memory and a printer's main nonvolatile memory. In FIG. 2, protected data memory unit 221 corresponds to the printer's nonvolatile memory 109 of FIG. 1, and protected data reserve memory unit 222 corresponds to the interface device's nonvolatile memory 135 of FIG. 1. While the remaining functional blocks 201-213 of FIG. 2 were previously attributed to CPU 102 in the example of FIG. 1, the block diagram of FIG. 2 defines each functional block individually to indicate that each may be implanted as a discrete component separate from CPU 102, or groups of functional blocks may be incorporated into one or more logic devices separate from CPU 102. Alternatively, some functional blocks may be implanted onboard CPU 102 while others are implemented off CPU 102 by other data processing devices.

In FIG. 2, the data protection unit has an event controller 201, a data backup unit 202, and data restore unit 203.

The backup unit 202 reads the protected data from the protected data memory 221, including as noted above printer settings set by the user and history data such as ink consumption that should not be lost if power is removed, and writes it to the protected data reserve memory 222, which likewise resists the loss of data when power is removed. As may be necessary, the restore unit 203 reads from reserve memory 222 the protected data originally stored in the protected data reserve memory 222 by the backup unit 202, and writes it to the protected data memory 221. The event controller 201 determines the data backup signaling and data restore signaling in response to which the backup unit 202 and restore unit 203 operate.

The event controller 201 also has an operation monitor 211, a backup event controller 212, and restore event controller 213.

The operation monitor 211 determines when the backup unit 202 or restore unit 203 operate based partly on the operations of printer 101, interface device 131, and operation requests, i.e. data commands, from host 161. As described previously with reference to FIG. 1, examples of operations that trigger backup unit 202 or restore unit 203 into operation include the following: (1) when the printer's power turns on, (2) when printer's power turns off, (3) when CPU 102 has been idle for a specific period, (4) when an update routine of protected data is complete, (5) when a data backup command is received from the host 161, and (6) when a data restore command is received from the host 161.

At the appropriate signaling of the operation monitor 211, the backup event controller 212 reads the protected data from protected data memory 221 and compares it with default settings preferably also stored in the protected data memory 221 to determine whether the read protected data should be written to protected data reserve memory 222. The backup event controller 212 thus determines if data backup is necessary. Examples for determining if data backup is necessary are described below.

Backup example 1: Counter values for protected data, such as the number of lines printed, printer operating time, automatic paper cutter operations, and the number of memory rewrites, are assigned an initial default value, such as 0 for example. The protected data stored in protected data memory 221 is compared with theses initial default values. If the counter values differs from its initial default value, then the protected data is backed up, otherwise no backup sequence is initiated.

Backup example 2: A first checksum based on the initial default values is compared with a second checksum calculated for the protected data stored in protected data memory 221. If the checksums differ, then the protected data is backed up, otherwise no backup sequence is initiated.

Backup example 3: Data stored in a predetermined address in protected data memory 221 is used as a rewrite flag, which is altered whenever the protected data is altered. If this rewrite flag differs from a default value, then the protected data is backed up, otherwise no backup sequence is initiated. For example, if the initial value of the rewrite flag is 1 and any change of the protected data memory 221 clears the rewrite flag to 0, a value 0 of the rewrite flag indicates that the protected data has been updated at least once.

Backup example 4: An identification number (ID number) for the main circuit board of printer 101 is stored both in the protected data memory 221 and in the protected data reserve memory 222, which preferably resides in the interface device. This makes it possible to determine if the interface device has been replaced by comparing the ID number stored in protected data memory 221 with the ID number stored in protected data reserve memory 222. If the ID numbers differ, then the protected data is backed up, otherwise no backup sequence is initiated.

At the appropriate signaling of the operation monitor 211, the restore event controller 213 reads the protected data from protected data reserve memory 222 and compares it with its preset default settings, which may be stored in protected data reserve memory 222, to determine whether to copy, i.e. restore, the read protected data to protected data memory 221. The restore event controller 213 thus determines if a data restore operation is necessary. Alternatively, the restore event controller 213 may also check the data values stored in protected data memory 221 of printer 101 to determine if they are set to default values prior to initiating a restore routine. Examples for determining the data restore timing are described below.

Restoring data, example 1: Counter values for protected data such as the number of lines printed, printer operating time, automatic paper cutter operations, and the number of memory rewrites are assigned an initial value, such as 0, for example. The protected data stored in protected data reserve memory 222 is compared with these initial values, and if any one count value differs from its initial value, then the protected data is restored to protected data memory 221, otherwise no restore sequence is initiated.

Restoring data, example 2: A first checksum based on default initial values of the protected data is compared with a second checksum calculated for the actual protected data stored in protected data reserve memory 222. If the checksums differ, then the actual protected data is restored to protected data memory 221, otherwise no restore sequence is initiated.

Figure 3:
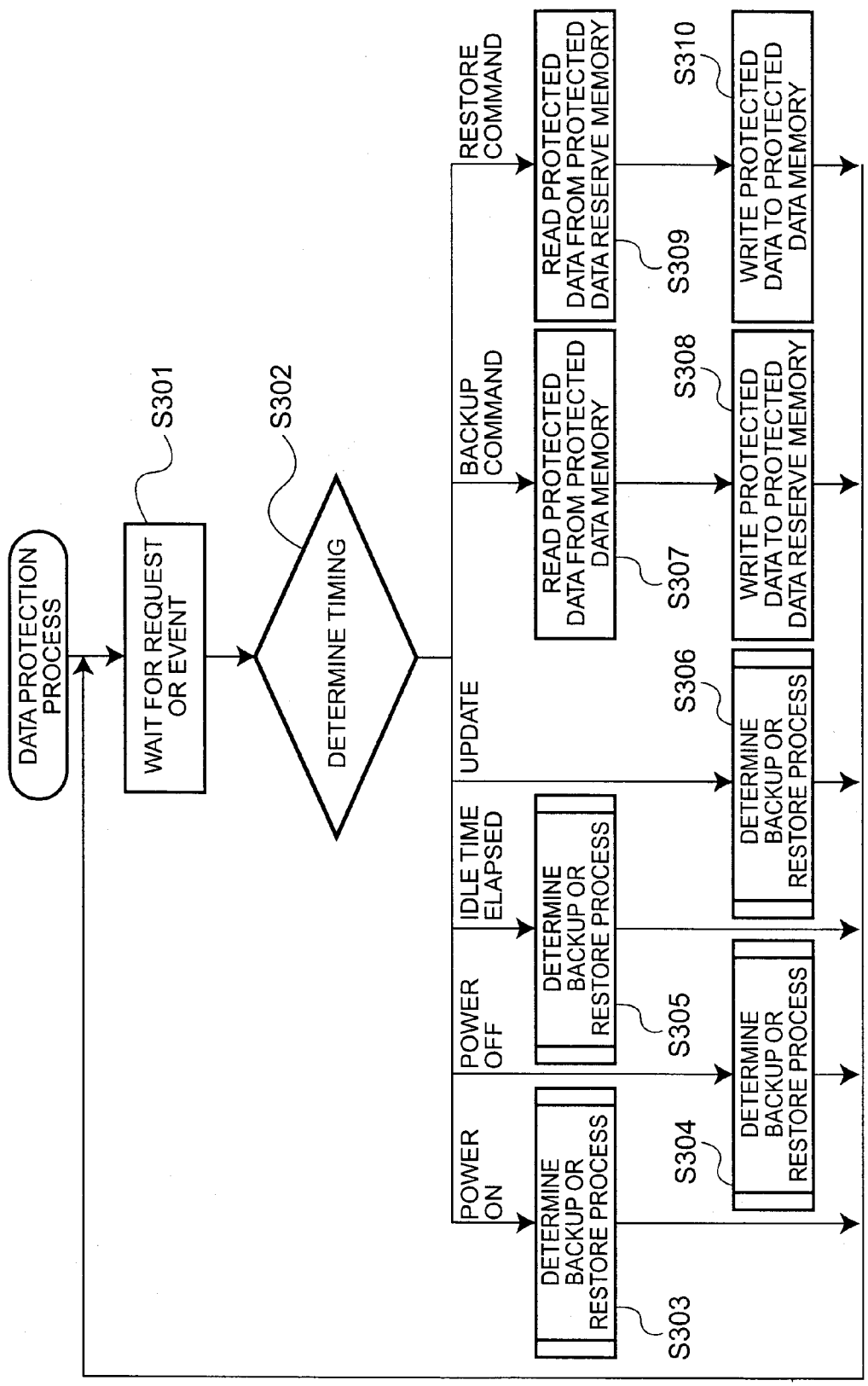
FIG. 3 is a flow chart of the data protection process.

FIG. 3 is a flow chart of the present data protection, i.e. backup and restore, process.

The CPU 102 first waits for a backup or restore triggering event from the printer 101, interface device 131, or the host 161 (S301), and determines (S302) the appropriate backup or restore process according to the type of observed, triggering event.

It should be noted that the examples of the data backup and restore triggering events described above with reference to FIG. 2 are used in the following description. In addition, the backup process refers to copying and storing protected data read from the protected data memory 221 to the protected data reserve memory 222, and the data restore process refers to copying and storing protected data from the protected data reserve memory 222 to the protected data memory 221.

In response to a printer power on event (step S302 returns a "power on" signal), the event controller 201 determines whether a condition for the backup or restore process is true, and as explained above, runs the backup or restore process (S303) as appropriate. Control then returns to step S301 to wait for the next triggering event.

In response to a printer power off event (step S302 returns a "power off" signal), the event controller 201 determines whether the conditions for the backup or restore process are true, and as explained above, runs the backup or restore process (S304) as appropriate. Control then returns to step S301 to wait for the next triggering event.

When the CPU 102 has been idle for the specified time (step S302 returns an "idle time elapsed" signal), the event controller 201 determines whether the conditions for the backup or restore process are true, runs the backup or restore process (S305) as appropriate, and control then returns to step S301 to wait for the next triggering event.

In response to completion of a protected data update event (step S302 returns a "data update"), the event controller 201 determines whether the conditions for the backup or restore process are true, runs the backup or restore process (S306) as appropriate, and control then returns to step S301 to wait for the next triggering event.

When a backup command is received from the host 161 (step S302 returns a "backup command" signal), the protected data is read from protected data memory 221 (S307), the read protected data is then stored to protected data reserve memory 222, a rewrite flag for the protected data memory 221 is cleared to 0 (S308) in protected data reserve memory 222, and control then returns to step S301 to wait for the next triggering event.

When a restore command is received from the host 161 (step S302 returns a "restore command" signal), the protected data is read from protected data reserve memory 222 (S309), the read data is stored to protected data memory 221 (S310). If required, a write flag may be set, or cleared as appropriate, in protected data memory 221. Control then returns to step S301 to wait for the next triggering event.

Figure 4:
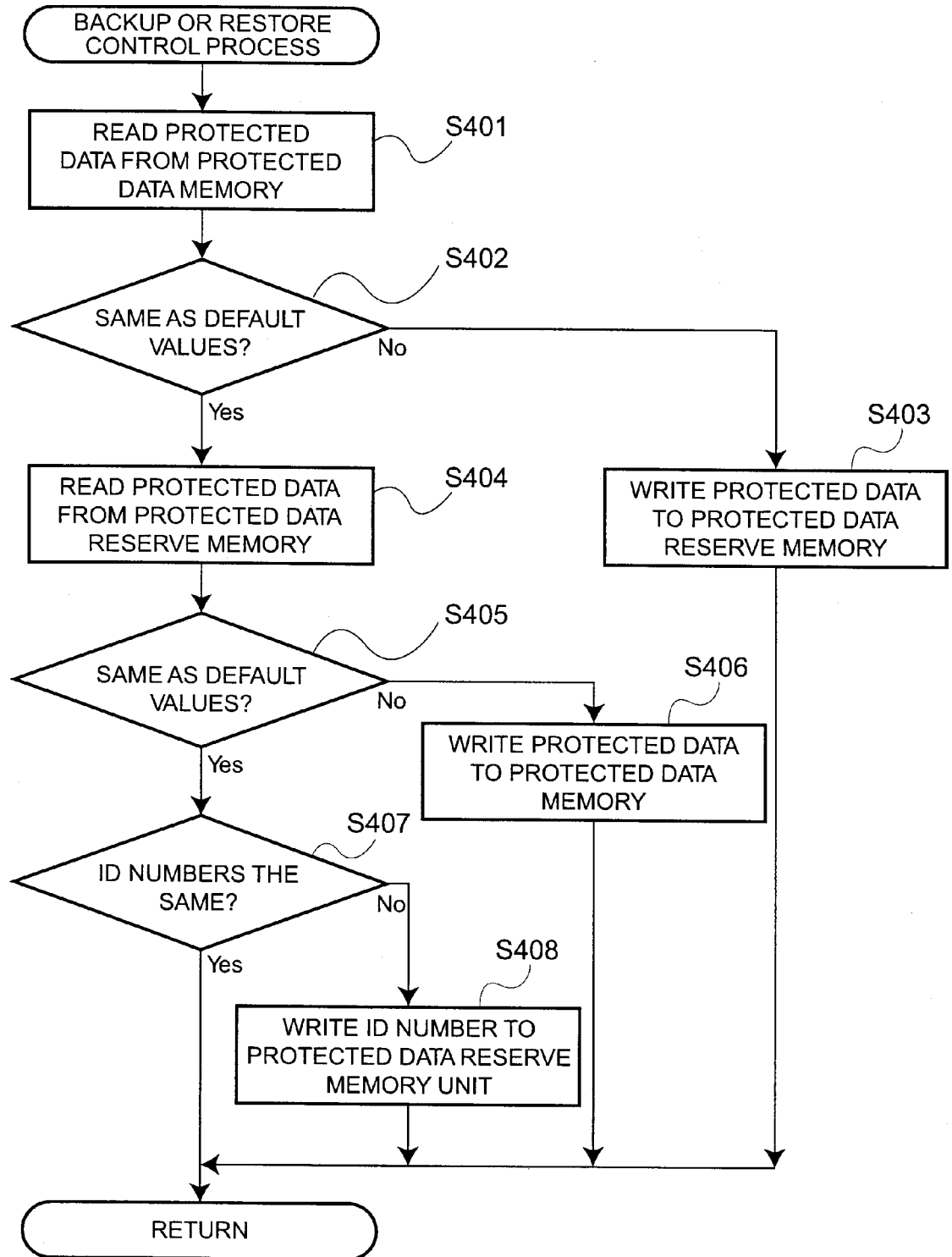
FIG. 4 is a flow chart of the backup/restore control process shown in the data protection process in FIG. 3.

FIG. 4 is a flow chart of the routine for determining whether to backup or restore data as part of the data protection process.

First, the current protected data content is read from the protected data memory 221 (S401) and compared with the initial, or default, values of the protected data, which are preferably stored in a predetermined section of protected data memory 221, to determine if the current protected data content is set to the initial, i.e. default, values (S402). In this example the current protected data content is assumed to be set to the initial values if any of the following conditions are true.

Condition 1: The counter values for individual protected data, such as the number of lines printed, printer operating time, automatic paper cutter operations, and the number of memory rewrites, are set to "0".

Condition 2: A first checksum of the current protected data content stored protected data memory 221 equals a second checksum predefined according to the initial values of the protected data.

Condition 3: A rewrite flag of protected data memory 221 is set to 1.

If the current protected data content and the initial, or default, values are not the same, that is, if any of the current protected data content has been updated at least once (step S402 returns "no"), then the current protected data content is stored, i.e. backed up, to the protected data reserve memory 222, a rewrite flag of the protected data memory 221 is cleared to 0 (S403), and the procedure ends.

However, if the initial values match the current protected data content, that is, the printer settings and history data have been cleared because of a repair, or the main circuit board has been replaced (S402 returns "yes"). In this case, reserved protected data content is read from protected data reserve memory 222 (S404) and compared with the preset initial values of the protected data, which are preferably also stored in protected data reserve memory 222, to determine if the reserve protected data content equals the initial, i.e. default, values(S405). The reserve protected data content is assumed to be set to the initial values if any of the following conditions are true.

Condition 1: The counter values for individual protected data, such as the number of lines printed, printer operating time, automatic paper cutter operations, and the number of memory rewrites stored in protected data reserve memory 222, are set to "0".

Condition 2: A first checksum of the reserve protected data content stored in protected data reserve memory 222 equals a second checksum predefined according to the initial values of the protected data.

If the reserve protected data content is not set to the initial values, that is, if the protected data has been copied, i.e. backed up, at least once from the protected data memory 221 to the protected data reserve memory 222 (i.e. step S405 returns "no"), the reserve protected data content read from the protected data reserve memory 222 is written to, i.e. restored to, the protected data memory 221 (S406), and the procedure ends.

If the protected data is set to the initial values, that is, if the interface device has been replaced (step S405 returns "yes"), it is determined whether the ID number of the main circuit board stored as protected data in the protected data memory 221 is the same as the main circuit board ID number stored as reserve protected data in the protected data reserve memory 222 (S407). If they are not the same (step S407 returns "no"), the main circuit board ID number stored in protected data memory 221 is written to the protected data reserve memory 222 (S408), and the procedure ends. If the ID numbers are the same (step S407 returns "yes"), the ID number is not copied and the procedure ends.

It will be obvious from the above description that this invention provides a printing apparatus capable of backing up and restoring printer settings and operating history data, an interface device, printer control method, interface device control method, and a computer-readable data storage medium recording a program achieving the data backup and restore processes.

It is therefore possible to store at an appropriate time such data as printer settings that have been updated from the default printer settings preset at the factory prior to shipping, and printer operating history data such as ink consumption information, stored to rewritable protected data memory provided on the main circuit board of the printer to a rewritable protected data reserve memory provided in the interface device or other device other than the main circuit board. As a result, if the main circuit board malfunctions and is replaced, the protected data backed up to the rewritable protected data reserve memory can be written to the rewritable protected data memory of the replacement main circuit board, thereby easily restoring the protected data.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printing apparatus connected to a host device through an external interface device, said printing apparatus comprising:
   a nonvolatile primary data memory unit for storing printing apparatus settings data;
   a receiver for receiving command data sent from said host device and relayed by said external interface device;
   a printing unit for printing text or image data when the received command data is a print command specifying text or image data;
   a data update unit for updating said printing apparatus settings data when the received command data requires the updating of settings data in said primary data memory unit; and
   a backup unit for copying settings data content from said primary data memory unit to a reserve data memory unit in said external interface device.

2. A printing apparatus as described in claim 1, wherein said backup unit is triggered to copy and store the settings data content from said primary data memory unit to said reserve data memory unit by the settings data being updated by the data update unit.

3. A printing apparatus as described in claim 1, wherein the backup unit copies and stores the settings data content from said primary data memory unit to said reserve data memory unit when the power to said printing apparatus turns on.

4. A printing apparatus as described in claim 1, further comprising a power off command input for receiving a power-off command indicating an interruption of power supply to said printing apparatus,
   wherein said backup unit is triggered to copy and store the settings data content from said primary data memory unit to said reserve data memory unit by said power-off command being received.

5. A printing apparatus as described in claim 1, further comprising a data restore unit for copying the data content of said reserve data memory unit to said primary data memory unit.

6. A printing apparatus as described in claim 5, wherein said data restore unit copies the data content of said reserve data memory unit to said primary data memory unit in response to said printing apparatus being turned on if said primary data memory unit does not hold current protected data and said current protected data is stored in said reserve data memory unit of said interface device.

7. A printing apparatus as described in claim 1, wherein said reserve data memory unit is a rewritable, nonvolatile reserve data memory unit.

8. A printing apparatus as described in claim 1, wherein said settings data content that is copied from said primary data memory unit to said reserve data memory unit is printing apparatus settings data.

9. A printing apparatus as described in claim 1, wherein the copying of said settings data content from said primary data memory unit to said reserve data memory unit in said external interface device is fully under control of said printing apparatus.

10. A printing apparatus control method for controlling a printing apparatus having a primary data memory unit for storing settings data in a nonvolatile manner, and connected to a host device through an external interface device, said printing apparatus control method comprising:
    a receive step for receiving command data sent from said host device and relayed by said interface device;
    a printing step for printing text or image data when the received command data is a print command specifying text or image data;
    a data update step for updating said settings data when the received command data is a command requiring the updating of settings data in said primary data memory unit; and
    a backup step for copying and storing, in a nonvolatile manner, settings data from said primary data memory unit to a reserve data memory unit of said external interface device.

11. A printing apparatus control method as described in claim 10, wherein said backup step copies and stores settings data from said primary data memory unit to said reserve data memory unit when the settings data content of said primary data memory unit is updated by said data update step.

12. A printing apparatus control method as described in claim 10, wherein said backup step copies and stores settings data from said primary data memory unit to said reserve data memory unit when power to said printing apparatus turns on.

13. A printing apparatus control method as described in claim 10, further comprising a power off command input step for receiving a power off command indicating an interruption of a power supply to said printing apparatus,
    wherein said backup step copies and stores settings data from said primary data memory unit to said reserve data memory unit in response to receiving said power off command.

14. A printing apparatus control method as described in claim 10, further comprising a data restore step for copying and storing setting data from said reserve data memory unit to said primary data memory unit.

15. A printing apparatus control method as described in claim 14, wherein the data restore step is initiated when power to said printing apparatus turns on if current settings data is not stored within said primary data memory unit but is stored within said reserve data memory unit.

16. A printing apparatus control method as described in claim 10, wherein said settings data is printing apparatus settings data.

17. A printing apparatus control method as described in claim 10, wherein in said backup step, the copying and storing in a nonvolatile manner of settings data from said primary data memory unit to said reserve data memory unit of said external interface device is fully under control of said printing apparatus.

* * * * *